(12) United States Patent
Madsen

(10) Patent No.: US 10,862,334 B2
(45) Date of Patent: Dec. 8, 2020

(54) ENERGY HARVESTING DEVICE

(71) Applicant: REMONI APS, Østbirk (DK)

(72) Inventor: Bo Eskerod Madsen, Østbirk (DK)

(73) Assignee: REMONI APS, Østbirk (DK)

(*) Notice: Subject to any disclaimer, the term of this patent is extended or adjusted under 35 U.S.C. 154(b) by 355 days.

(21) Appl. No.: 15/073,812

(22) Filed: Mar. 18, 2016

(65) Prior Publication Data
US 2016/0204655 A1    Jul. 14, 2016

Related U.S. Application Data

(63) Continuation of application No. PCT/DK2014/000047, filed on Sep. 15, 2014.

(51) Int. Cl.
*H05K 7/14* (2006.01)
*H02J 50/00* (2016.01)
*H02J 50/05* (2016.01)

(52) U.S. Cl.
CPC .......... *H02J 50/001* (2020.01); *H02J 50/05* (2016.02)

(58) Field of Classification Search
CPC ........ H02J 50/05; H02J 50/001; H02N 1/108; H02N 11/002
See application file for complete search history.

(56) References Cited

U.S. PATENT DOCUMENTS 5,892,430 A    4/1999 Wiesman et al.
6,755,676 B2 * 6/2004 Milan ................... H01R 25/003
                                                       439/214

2013/0076202 A1 * 3/2013 Naito ...................... H02N 1/08
                                                      310/300
2013/0187637 A1 * 7/2013 Saxby ..................... H02J 50/05
                                                      324/127
2014/0049398 A1 * 2/2014 Kovacich ............. G01R 19/155
                                                      340/660

FOREIGN PATENT DOCUMENTS

JP    2003-1535557 A      5/2003
JP    2003153557 A    *   5/2003
JP    2011-078274 A       4/2011
JP    2012-139066 A       7/2012

(Continued)

OTHER PUBLICATIONS

Keun-Su Chang: Electric Field Energy Harvesting Powered Wireless Sensors for Smart Grid.*

(Continued)

*Primary Examiner* — Rexford N Barnie
*Assistant Examiner* — Rasem Mourad
(74) *Attorney, Agent, or Firm* — Lathrop GPM LLP

(57) ABSTRACT

An energy harvesting device is configured to surround a portion of an electrical cable (4), and includes a plurality of electrically separated and electrically conducting patch members (22, 22', 24, 24', 26, 26') configured to be arranged in such a manner that an electric potential difference (V) is provided between a first outlet point (B) and a second outlet point (A). The patch members (22, 22', 24, 24', 26, 26') are electrically connected to the first outlet point (B) and to the second outlet point (A). The patch members (22, 22', 24, 24', 26, 26') are configured to be attached non-invasively direct onto the electrical cable (4).

18 Claims, 7 Drawing Sheets

(56) References Cited

FOREIGN PATENT DOCUMENTS

JP          2012139066 A   *   7/2012
KR       20130029775 A   *   3/2013   ............. G06Q 40/02

OTHER PUBLICATIONS

Office Action from Japanese Patent App. No. 2016-515498 dated Mar. 14, 2017.
Chang, K., et al., "Electric Field Energy Harvesting Powered Wireless Sensors for Smart Grid," J. Elec. Eng. Technol. 2012;7(1):75-80.
International Search Report for PCT Patent App. No. PCT/DK2014/000047 (dated Jan. 8, 2015).
Assis, A. T., et al., "The Electric Field Outside a Stationary Resistive Wire Carrying a Constant Current," Foundation of Physics 1999;29(5):729-753.
Jackson, J.D., "Surface charges on circuit wires and resistors play three roles," The American Journal of Physics 1996;64(7):855-870.

* cited by examiner

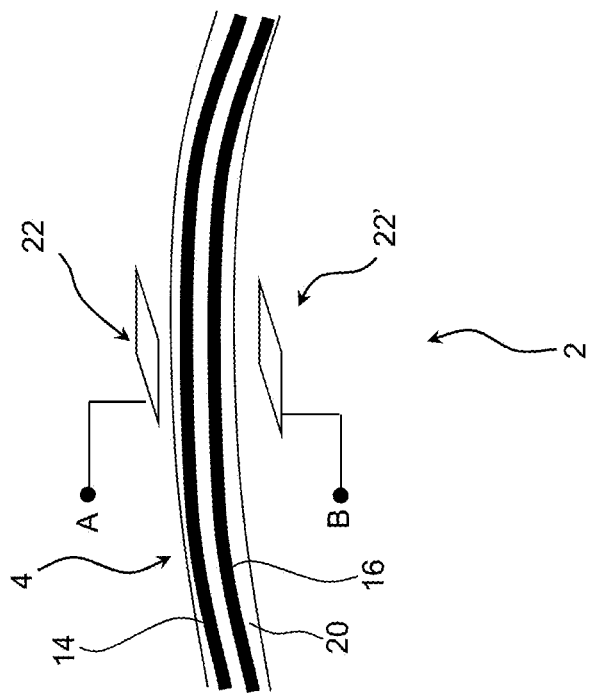
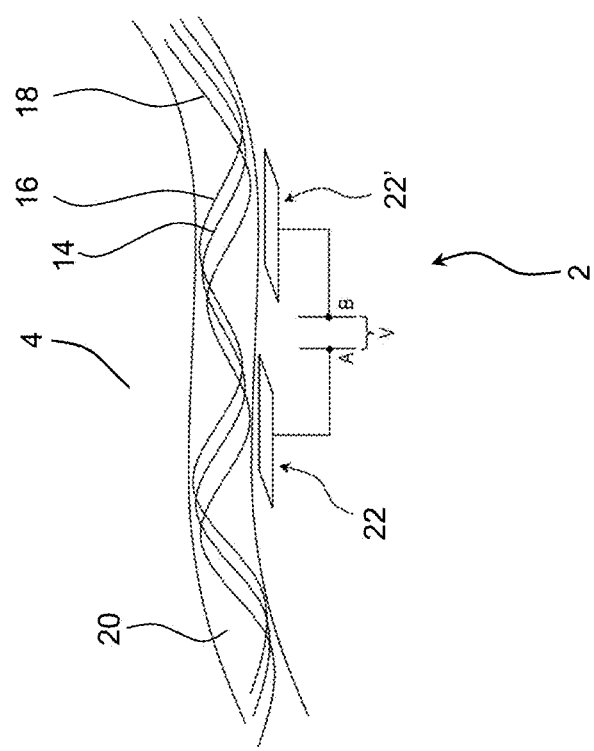

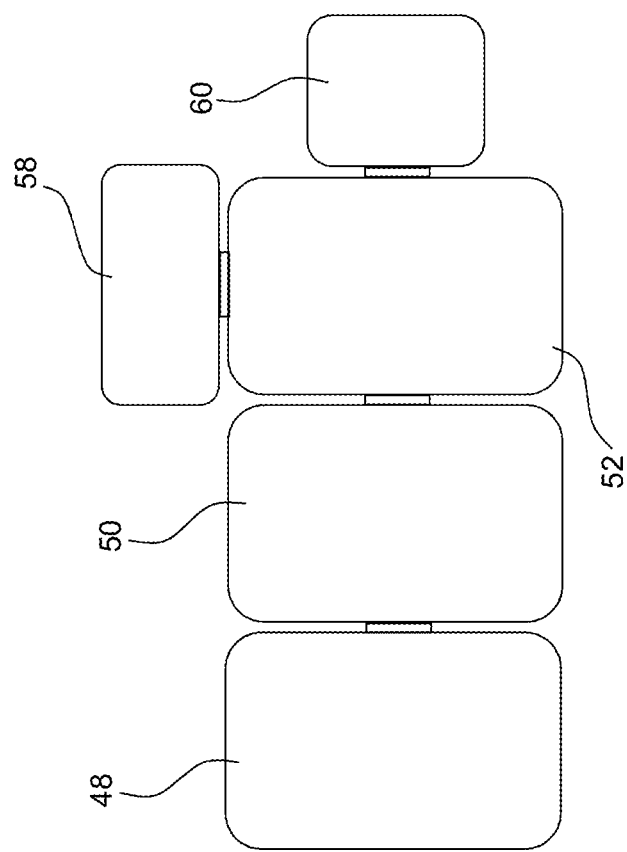
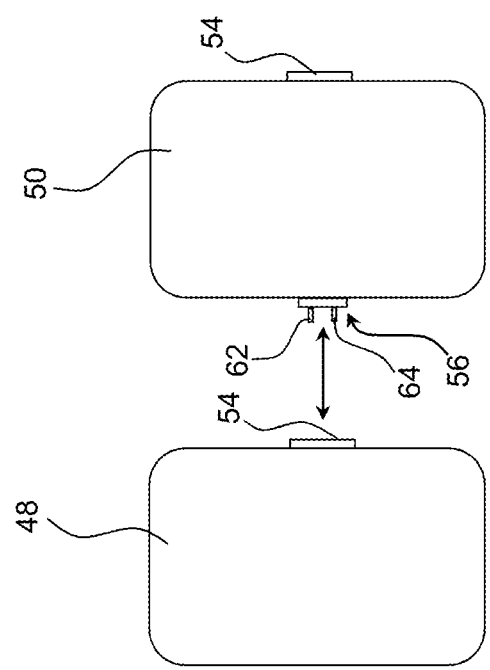

US 10,862,334 B2

ENERGY HARVESTING DEVICE

This application is a Continuation of, and claims priority under 35 U.S.C. § 120 to, International App. No. PCT/DK2014/000047, filed 15 Sep. 2014, and under 35 U.S.C. §§ 119, 365 therethrough to Danish App. No. PA 2013 00534, filed 19 Sep. 2013, the entireties of which are incorporated by reference herein.

BACKGROUND

Field of Endeavor

The present invention generally relates to an energy harvesting device for harvesting energy from electrical cables.

Brief Description of the Related Art

The use and number of distributed sensor systems is constantly growing these days, and the need for powering the sensors, and the associates wireless communication, has grown correspondingly.

One major challenge in these systems is the required energy supply to the systems, without the challenge of maintaining a large number of batteries, often in inadequate places. One of the known solutions to this challenge is energy harvest where ambient energy is harvested more or less continuously, to supply the devices.

The typical energy sources used in energy harvesting are light, vibration or temperature differences. Unfortunately, in typical technical installations, where sensors are often installed, none of these energy sources is present.

Electrical cables (e.g. electrical conductors) are, however, not in short supply in technical installations, and an easy system to harvest energy from electrical cables may therefore be a good solution to cover the need for energy.

The available solutions to harvest energy from electrical conductors make use of two different main principles:
1) Electromagnetic harvest from single wires by induction, as described in, e.g., Bhuiyan et. al. (A Miniature Energy Harvesting Device for Wireless, Sensors in Electric Power System, IEEE SENSORS JOURNAL, VOL. 10, NO. 7, JULY 2010) (D1) and
2) Energy harvest from the difference in the electrical field between the electrical conductors and ground, as described in Chang, K. et. Al (Electric Field Energy Harvesting Powered Wireless Sensors for Smart Grid, Journal of Electrical Engineering & Technology Vol. 7, No. 1, pp. 75-80, 2012) (D2).

Both principles are associated with serious problems. Electromagnetic harvest from single wires by induction requires connection on a single conductor. Accordingly, the outer insulation of the electrical cable needs to be peeled off in order to install the energy harvester.

By removing the outer insulation, the safety of the electrical installation is compromised, and an outer shielding must be installed to recover the insulation. Furthermore, the inductive energy harvesters are relatively expensive to produce, and depend on an electrical current running in the conductor.

Energy harvest from the difference in the electrical field between the electrical conductors and ground is cheaper than electromagnetic harvest from single wires by induction, and can be installed on the outside of a multicore cable. On the other hand, this principle requires physical connection to electrical ground. Accordingly, these types of energy harvesters are inapplicable in many applications.

Accordingly, there is need for an energy harvesting device that is easier to install.

One of numerous aspects of devices embodying principles of the present invention includes an energy harvesting device that does not require connection to a single conductor of the electrical cable from which energy is harvested.

Another aspect includes a standalone energy harvesting device that does not require connection to electrical ground.

Another aspect includes an energy harvesting device that is capable of providing a voltage in the region between 1 and 10 volt without using a converter to step up the voltage.

Yet another aspect includes an energy harvesting device that does not depend on current running in the cable.

Moreover, in case that a larger current is needed, it would be possible to apply several patches. However, the documents D1 and D2 do not stress this challenge or suggest how to solve the challenge.

Therefore, another aspect includes an energy harvesting device that applies a plurality of patches.

SUMMARY

Preferred embodiments are explained in the following description and illustrated in the accompanying drawings.

In the present context, an "energy harvesting device" refers to a device, which is adapted to harvest electrical energy.

An energy harvesting device according to principles of the present invention is an energy harvesting device configured to surround a portion of an electrical cable. The energy harvesting device comprises a plurality of electrically separated and electrically conducting patch members configured to be arranged in such a manner that an electric potential difference is provided between a first outlet point and a second outlet point, where the patch members are electrically connected to the first outlet point and/or to the second outlet point. The patch members are configured to be attached directly onto the electrical cable or in close proximity of the cable.

Hereby it is possible to provide an energy harvesting device that does not require electrical connection to a conductor of the electrical cable from which energy is harvested.

The installation of the energy harvesting device to a cable is simple, easy and safe.

Moreover, the energy harvesting device does not require connection to electrical ground.

While the prior art electromagnetic energy harvesting devices require conversion of the voltage in order to use the energy in standard electrical devices, the energy harvesting devices described herein are capable of providing a voltage in the region between 1 and 10 volt without the use of a converter (e.g., a DC-DC converter) to step up the voltage.

Depending on the voltage of the cable and the size of the energy harvester, the energy harvesting device is capable of harvesting power in the region of microwatt or milliwatt.

The energy harvesting device is capable of harvesting electrical energy as long as the cable is electrically connected to a source of potential difference. The cable is not required to be "current-carrying". This is major advantage since the energy harvesting device is capable of harvesting electrical energy continuously if the cable of an electrical device is connected to the mains even if the electrical device is switched off. Accordingly, less power is required to be harvested when compared to an energy harvesting device that is only capable of harvesting electrical energy from a cable of an electrical device when the electrical device draws a current.

It may be an advantage that the patch members are plate shaped, e.g., having a rectangular shape.

It may be preferred that the patch members are rectangular and have dimensions such as 5×25 mm, 2×10 mm, or 8×40 mm.

It may be beneficial that that the energy harvesting device comprises a plurality of patch members that are electrically separated by separation members.

The electrically separation members may be produced in a non-conducting material such as plastic.

The separation members may be configured to be attached to the cable by gluing or by a mechanical attachment method.

It may be an advantage that the patch members are electrically connected to a rectification unit by a number of connection members and that the rectification unit comprises a plurality of rectifiers configured to rectify currents from the patch members in a predefined way.

Hereby it is possibly to provide an optimum power harvest from a cable with an alternating current (AC) or a direct current (DC).

It may be beneficial that the energy harvesting device is configured to rectify currents from a first group of the patch members by rectifiers providing a first current direction, where the energy harvesting device is configured to rectify currents from the remaining patch members by other rectifiers providing another current direction.

It is advantageous that the energy harvesting device is configured to build up a potential difference between the first outlet point and the second outlet point.

It may be beneficial that the energy harvesting device is configured to rectify all current from the patch members and hereby build up a potential difference between the first outlet point and the second outlet point.

It may be an advantage that the patch members are made from flexi print, preferably flexi print that is sealed in a sealing material.

It may be advantageous that the patch members are electrically connected to a rectification unit by a number of connection members (e.g., wires).

This construction is easy to provide in a reliable manner. Moreover, it is easy producible.

It may be an advantage that each patch member is (directly) electrically connected to a first rectifier configured to rectify the current from the patch member in one direction and to a second rectifier configured to rectify the current from the patch member in the opposite direction.

Hereby it is easy to provide an easy and efficient rectification of the current from each patch member.

It may be beneficial that the rectification unit is provided with a plurality of rectifiers adapted to rectify alternating current from the patch members in one predefined direction.

Accordingly, the rectification unit may be used to rectify current from all patch members in one predefined direction.

It may be an advantage that the current from each of the patch members is conducted through a connection member (e.g., a wire) and further through a first main connector electrically connected to a first outlet point.

Further it may be advantageous that the current from each of the patch members is conducted through a connection member (e.g., a wire) and further through a second main connector electrically connected to a second outlet point.

In this manner it is possible to provide a potential difference between the first and second outlet points.

It may be beneficial that the rectification unit comprises an energy storage.

Hereby it is possible to store harvested energy for later use.

It may be an advantage that the energy storage is a capacitor and/or a battery.

It may be advantageous that the patch is configured to be wrapped in multiple layers around a cable.

It may be beneficial that the energy harvesting device comprises several separate modules each configured to harvest electrical energy, where the modules comprise means for electrically connecting the modules to each other.

Hereby it is possible to harvest a larger amount of energy and to build energy harvesting devices of different size and capacity.

It may be beneficial to have an electrical device with a built-in energy harvester device as described herein.

Hereby it is possible to attach the electrical device with the built-in energy harvester device to a cable. The electrical device with a built-in energy harvester device will then be provided with energy harvested by the energy harvester device.

It may be an advantage to have a sensor with a built-in energy harvester device as described herein.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 5a shows a schematically cross-sectional view of an energy harvesting device;

FIG. 5b shows a schematically cross-sectional view of another energy harvesting device;

FIG. 6a shows a schematically front view of a modular energy harvesting device in a disassembled state;

FIG. 6b shows a schematically front view of a modular energy harvesting device in an assembled state.

DETAILED DESCRIPTION OF EXEMPLARY EMBODIMENTS

Referring now in detail to the drawings for the purpose of illustrating preferred embodiments, an energy harvesting device 2 is attached to a cable 4 of an electrical device 6.

Figure 1:
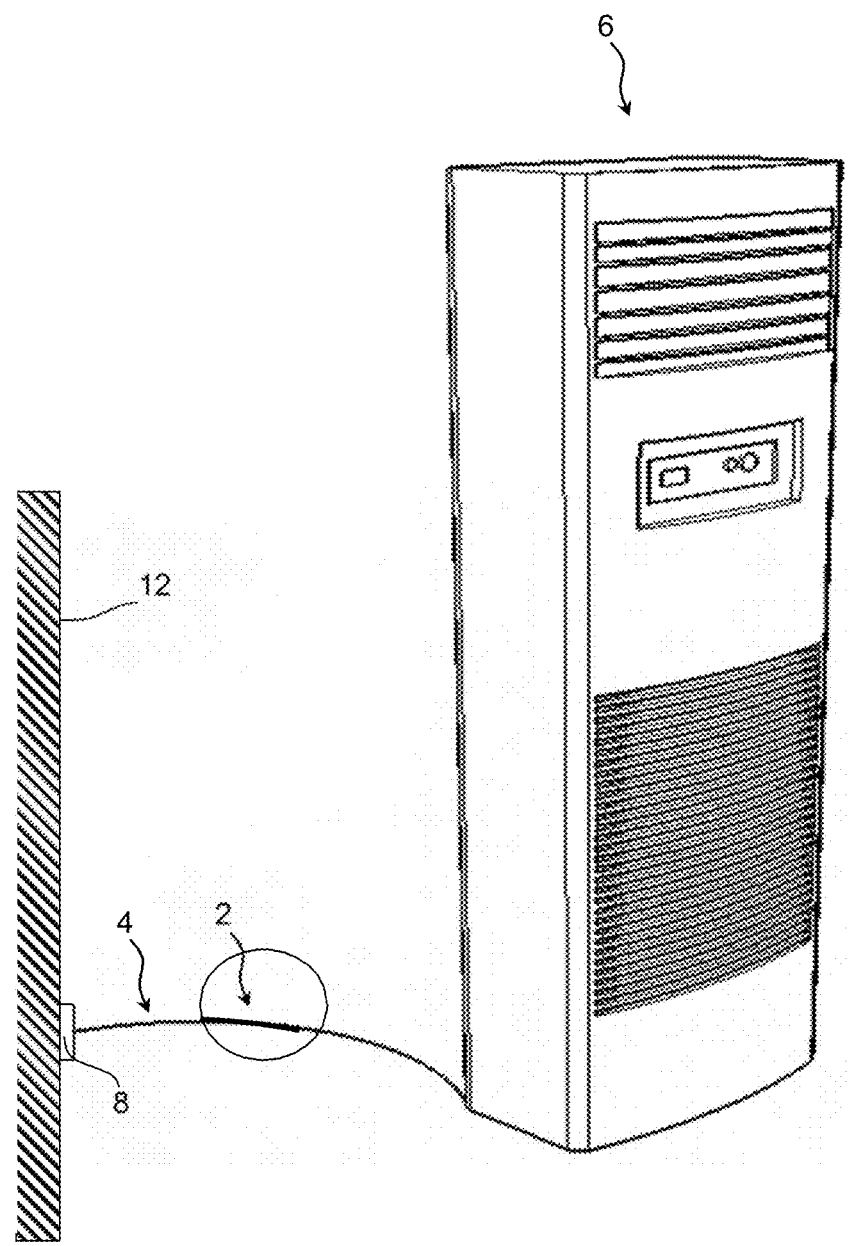
FIG. 1 shows an electrical device having a cable onto which an energy harvesting device according to principles of the present invention is attached.

FIG. 1 illustrates a perspective view of an electrical device 6 and a cross-sectional view of a wall 12. The electrical device 6 is electrically connected to the mains through the wall 12.

The electrical device 6 includes a cable 4 that is connected to the mains via the wall 12.

An energy harvesting device 2 according to principles of the present invention is attached to the outside surface of the cable 4. The energy harvesting device 2 is indicated by a circle.

The energy harvesting device 2 is configured to harvest energy from the cable 4 and supply a power consuming electrical device (not shown) with electrical power. The power consuming electrical device may be a sensor and/or a transmitter. It may be preferred, however, that the power consuming electrical device has a low energy demand (e.g., in the nano-watt or micro-watt area).

Figure 2:
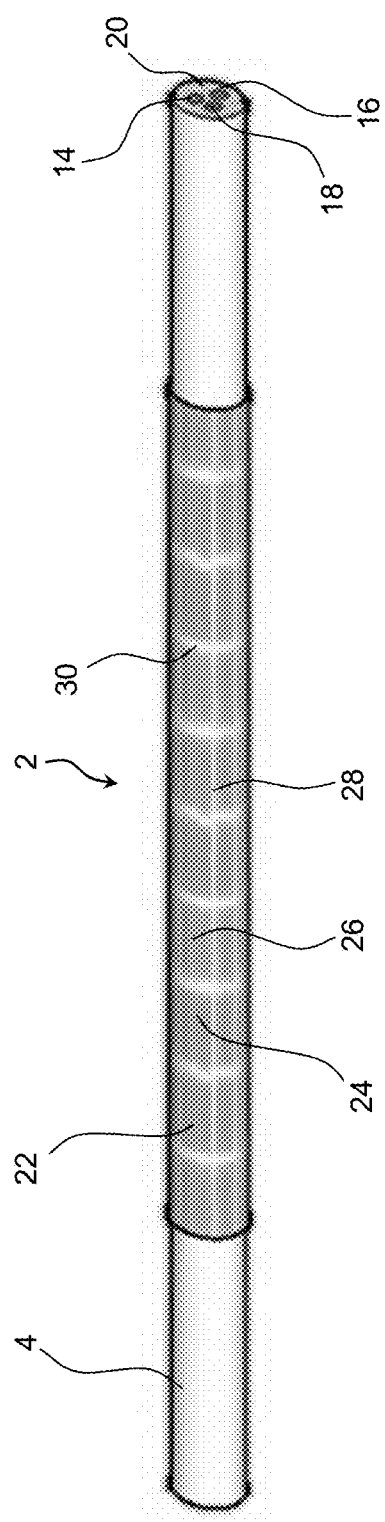
FIG. 2 shows a close-up view of an energy harvesting device attached to an electrical cable.

FIG. 2 illustrates a close-up perspective view of an energy harvesting device 2 attached to an electrical cable 4. The cable 4 has a circular cross-section and includes three conductors 14, 16, 18 surrounded by an insulator 20.

The energy harvesting device 2 surrounds a portion of the cable 4. The energy harvesting device 2 includes a plurality of patch members 22, 24, 26 that are electrically separated by separation members 28, 30.

The energy harvesting device 2 may be glued or mechanically connected to the cable 4.

The energy harvesting device 2 is configured to harvest electrical energy from the cable 4 and supply a power consuming electrical device (not shown) with electrical power.

It may be an advantage that the energy harvesting device 2 is configured to be mounted on a cable 4 by glue or other attachment means allowing a quick non-invasive attachment of the energy harvesting device 2 to the cable 4.

Figure 3:
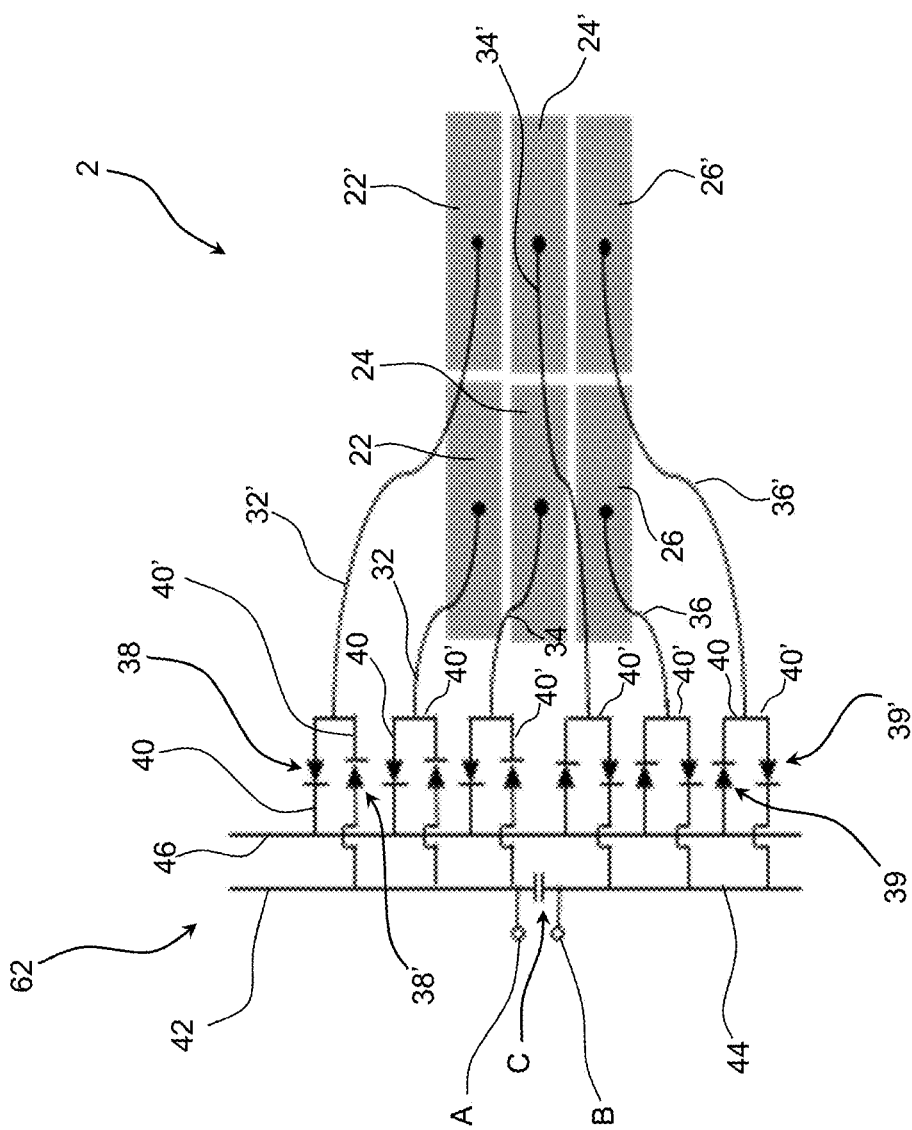
FIG. 3 shows a schematically diagram of a first embodiment of an energy harvesting device.

FIG. 3 schematically illustrates a diagram of a first embodiment of an energy harvesting device 2. The energy harvesting device 2 includes six patch members 22, 22', 24, 24', 26, 26'.

The patch members 22, 22', 24, 24', 26, 26' are electrically separated from each other. The patch members 22, 22', 24, 24', 26, 26' are electrically connected to a rectification unit 62 by a number of wires 32, 32', 34, 34', 36, 36' and/or the rectifiers are connected directly to the patches. The rectification unit 62 includes a plurality of rectifiers 38, 38' configured to rectify the currents from each patch member 22, 22', 24, 24', 26, 26' in a predefined way. This is important when harvesting electrical energy from a cable with an alternating current.

The currents from the patch members 22', 22, 24 are rectified by rectifiers 38, 38'. The current from the patch members 22', 22, 24 is conducted through the wires 40 and further through the main connector 46 and further through the wires 40, 40' to the main connector 44.

On the other hand, the current from the patch member 24', 26, 26' are rectified by rectifiers 39, 39'. The current from the patch members 24', 26, 26' is conducted through the wires 40' and further through the main connector 44.

Hereby a potential difference is achieved between the main connector 42 that is electrically connected to the first outlet point A and the main connector 44 that is electrically connected to the second outlet point B.

The patch members 22, 22', 24, 24', 26, 26' are electrical conducting and configured to be attached to the surface of an electrical cable 4. Each island patch members may be, e.g., 5×25 mm, 2×10 mm, or 8×40 mm, by way of example. The patch members 22, 22', 24, 24', 26, 26' are connected to the rectification unit 62 that can also function as an energy storage unit including a battery and/or a capacitor having a large capacitance.

The rectification unit 62 includes rectifiers 38, 38', 39, 39' in the form of diodes. The rectification unit 62 includes an energy storage in the form of a capacitor C provided between the outlet points A and B. The rectification unit 62 may have an energy storage device, e.g., a battery, from which the energy may be delivered.

The illustrated rectifier unit allows for both alternation current and direct current.

Figure 4:
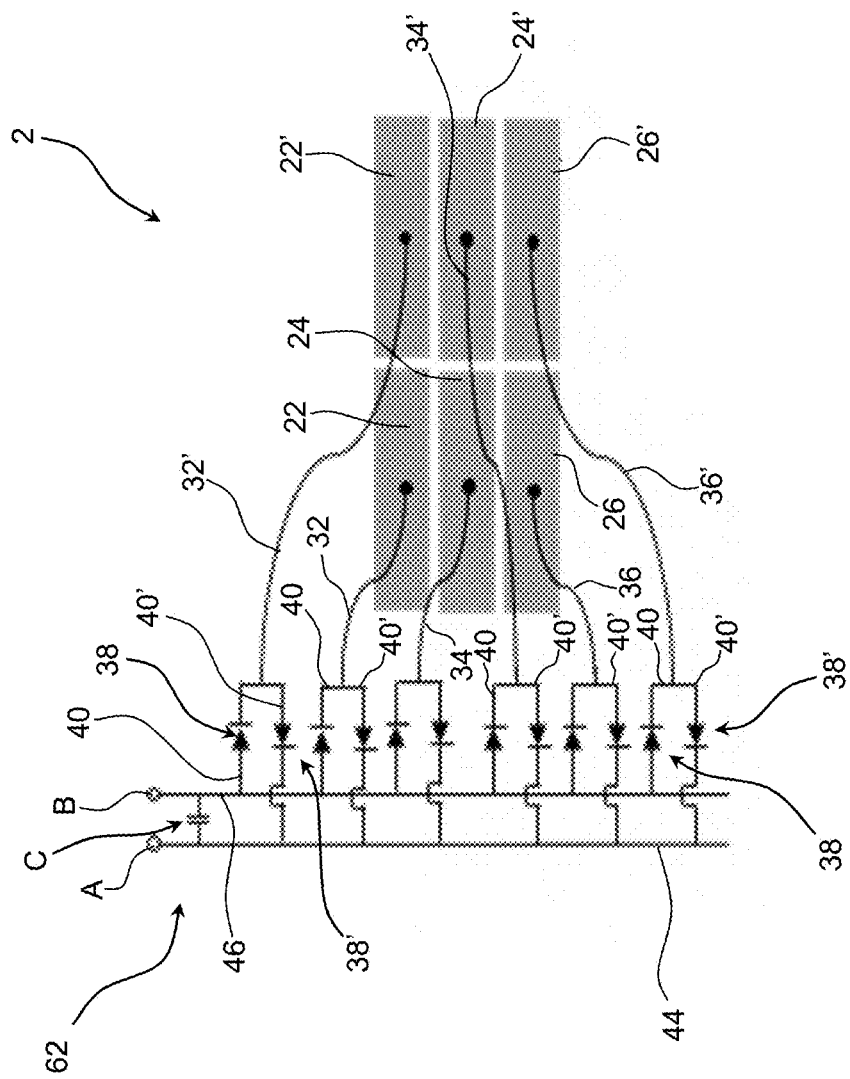
FIG. 4 shows a schematically diagram of a second embodiment of an energy harvesting device.

The rectifiers 38, 38', 39, 39' from each patch member 22, 22', 24, 24', 26, 26' may be connected in parallel, if the energy harvester device 2 is attached to an alternating current application (see FIG. 4).

The single patch member 22, 22', 24, 24', 26, 26' may be coupled using, e.g., FETs (field effect transistors).

It may be an advantage that rectifiers 38, 38', 39, 39' may have low leakage current (e.g., 1 nA) to avoid energy loss in the system, and a relative low forward voltage (e.g., 1V) to ensure high input to the energy storage (the capacitor C) of the rectification unit 62. In case a more condense energy harvester device 2 is wanted, the patch member 22, 22', 24, 24', 26, 26' can wrapped in multiple layers around the cable. This approach further allows distribution of the same energy harvester device 2 for multiple different cable diameters.

FIG. 4 schematically illustrates a diagram of another embodiment of an energy harvesting device 2. The energy harvesting device 2 includes six patch members 22, 22', 24, 24', 26, 26'.

Like those illustrated in FIG. 3, the patch members 22, 22', 24, 24', 26, 26' are electrically separated from each other. The patch members 22, 22', 24, 24', 26, 26' are electrically connected to a rectification unit 62 by a number of wires 32, 32', 34, 34', 36, 36' and/or the rectifiers are connected directly to the patches.

The rectification unit 62 is provided with a plurality of rectifiers 38, 38' adapted to rectify alternating current from the patch members 22, 22', 24, 24', 26, 26' in a desired direction.

The currents from the patch members 22', 22, 24, 24', 26', 26' are rectified by rectifiers 38, 38'. The currents from the patch members 22', 22, 24, 24', 26', 26' are conducted through the wires 40' and further through the main connector 44 that is electrically connected to an outlet point A. A second outlet point B is electrically connected to a main conductor 46 that is electrically connected to the patch members 22', 22, 24, 24', 26', 26' through wires 40, rectifiers 38 and further via wires 32, 32', 34, 34', 36, 36'.

When there is electrical potential difference between the patch members 22', 22, 24, 24', 26', 26', a potential difference is achieved between the main connectors 44 and 46. Accordingly, at potential difference is achieved between the outlet points A and B. A capacitor C is provided between the outlet points A and B. The rectification unit 62 may have a battery as energy storage.

FIG. 5a schematically illustrates a cross-sectional view of an energy harvesting device 2. The energy harvesting device 2 is configured to be attached to an electrical cable 4 including three conductors 14, 16, 18 that are twisted. The conductors 14, 16, 18 are surrounded by an insulator 20.

The energy harvesting device 2 includes a first patch member 22 and a second patch member 22' that are configured to be arranged on or attached to the outer surface of the current-carrying cable 4, e.g., by gluing. Due to the electric field surrounding the current-carrying cable 4, a potential difference can be achieved between the first patch member 22 and the second patch member 22'. Accordingly, a potential difference V can be achieved between the first patch member 22 and the second patch member 22'.

Since the potential difference V between the first patch member 22 and the second patch member 22' may be very little, it is preferred that the energy harvesting device 2 according to the invention includes a larger number of patch members.

FIG. 5b schematically illustrates a cross-sectional view of another energy harvesting device 2. The energy harvesting device 2 is configured to be attached to a current-carrying cable 4 including two conductors 14, 16 surrounded by an insulator 20. The energy harvesting device 2 has a first patch member 22 and a second patch member 22'.

Due to the electric field surrounding the current-carrying cable 4, a potential difference can be achieved between the first patch member 22 and the second patch member 22'. Therefore, a potential difference can be achieved between the first outlet point A and the second outlet point B.

The potential difference V between the first patch member 22 and the second patch member 22' may be extremely small. Accordingly, the energy harvesting device 2 according to the invention preferably includes a large number of patch members 22, 22'.

FIG. 6a schematically illustrates a front view of a modular energy harvesting device 2. The energy harvesting device 2 is shown in a disassembled state.

The energy harvesting device 2 includes a first module 48 provided with a socket 54. The energy harvesting device 2 also includes a second module 50 provided with a socket 54 and a plug 56 configured to be received by the socket 54 of the first module 48 and hereby providing electrical connection between the first module 48 and the second module 50.

By electrically connecting several modules 48, 50 it is possible to harvest more electrical power than by using fewer modules.

FIG. 6b schematically illustrates a front view of a modular energy harvesting device 2 in an assembled state.

The energy harvesting device 2 includes a first module 48 similar to the one shown in FIG. 6a. A second module 50 is attached to the first module 48 by an electrical connection between a plug and a socket like illustrated in FIG. 6a. Similarly, a third module 52 is attached to the second module 50 by an electrical connection.

The energy harvesting device 2 is electrically connected to a first power consuming electrical device 58 and to a second power consuming electrical device 60 by electrical "plug-socket" connections.

Hereby, the power consuming electrical devices 58, 60 can be energized by the energy harvesting device 2.

Figure 7:
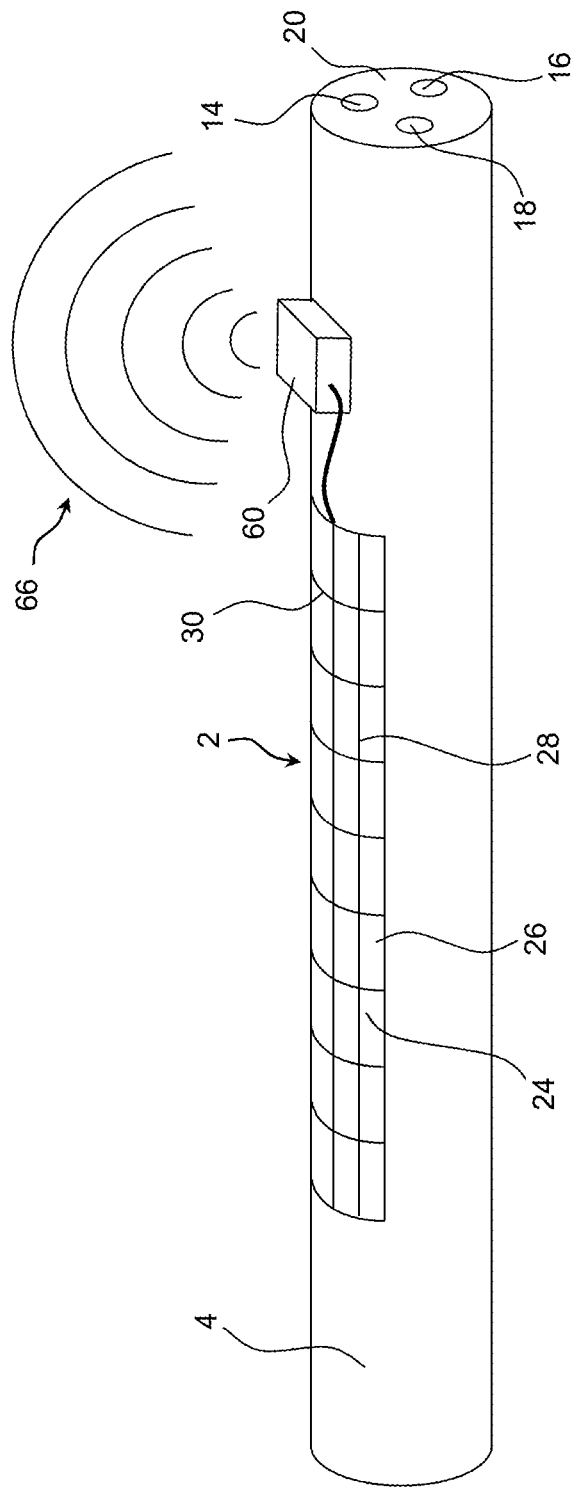
FIG. 7 shows an energy harvesting device attached to a high voltage cable.

FIG. 7 illustrates an energy harvesting device 2 attached to a high voltage cable 4.

The cable 4 has a circular cross section and has three conductors 14, 16, 18 surrounded by an insulator 20. The energy harvesting device 2 surrounds a central portion of the cable 4 and includes a plurality of patch members 22, 24, 26 that are electrically separated by separation members 28, 30.

The energy harvesting device 2 is electrically connected to a sensor 60 that is configured to transmit a wireless signal 66 to a receiver (not shown). The sensor 66 is powered by the power harvested by the energy harvesting device 2. The power harvested by the energy harvesting device 2 may be within the range of milliwatts depending on the voltage of the cable 4 and the size of the energy harvester.

LIST OF REFERENCE NUMERALS

2—Energy harvesting device
4—Electrical cable
6—Electrical device
8—Plug
12—Wall
14, 16, 18—Conductor
20—Insulator
22, 24, 26—Patch member
22', 24', 26'—Patch member
28, 30—Separation member
32, 32', 34, 34'—Wire
36, 36', 40, 40'—Wire
38, 38', 39, 39'—Rectifier
42, 44, 46—Main connector
48, 50, 52—Module
54—Socket
56—Plug
58, 60—Electrical device
62, 64—Pin
66—Signal
A, B—Outlet point
V—Potential difference
C—Capacitor/energy storage While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

That which is claimed is:

1. An energy harvesting device configured to surround a portion of an electrical cable and harvest energy from an electric field outside of and generated by the electrical cable, the energy harvesting device comprising:
   a plurality of rectifiers; and
   a plurality of electrically separated and electrically conducting patch members electrically connected to a first outlet point (A) and to a second outlet point (B) by said rectifiers;
   wherein a first group of the rectifiers is electrically coupled to rectify currents from a first group of the patch members in a first current direction, and the remaining rectifiers are electrically coupled to rectify currents from the remaining patch members in a second current direction, whereby, when the patch members surround a portion of the electric cable, the electric field causes an electric potential difference (V) between the first outlet point and the second outlet point.

2. An energy harvesting device according to claim 1, further comprising:
   separation members electrically separating the plurality of patch members.

3. An energy harvesting device according to claim 1, further comprising:
   a plurality of connection members; and
   a rectification unit comprising said plurality of rectifiers, the rectification unit being electrically connected to the patch members by said connection members.

4. An energy harvesting device according to claim 1, further comprising:
   connection members; and a rectification unit electrically connected to the patch members by said connection members.

5. An energy harvesting device according to claim 4, wherein the rectification unit comprises the plurality of rectifiers.

6. An energy harvesting device according to claim 1, further comprising:
a first connection member and a first main connector electrically connected to the first outlet point;
wherein the current from each of the patch members is conducted through the first connection member and further through the first main connector.

7. An energy harvesting device according to claim 6, further comprising:
a second connection member and a second main connector electrically connected to the second outlet point;
wherein the current from each of the patch members is conducted through the connection member and further through the second main connector.

8. An energy harvesting device according to claim 4, wherein the rectification unit comprises an energy storage device.

9. An energy harvesting device according to claim 8, wherein the energy storage device is a capacitor and/or a battery.

10. An energy harvesting device according to claim 1, wherein the patch members are configured to be wrapped in multiple layers around the cable.

11. An energy harvesting device according to claim 1, further comprising:
a plurality of separate modules each configured to harvest electrical energy, wherein each of the plurality of modules comprises means for electrically connecting the modules to each other.

12. An energy harvesting device according to claim 1, wherein each patch member is electrically connected to a first of said rectifiers configured to rectify the current from the patch member in one direction and to a second of said rectifiers configured to rectify the current from the patch member in the opposite direction.

13. An energy harvesting device according to claim 1, further comprising:
a first connection member and a first main connector electrically connected to the first outlet point;
wherein the current from said first group of patch members is conducted through the first connection member and further through the first main connector.

14. An energy harvesting device according to claim 1, further comprising:
a second connection member and a second main connector electrically connected to the second outlet point;
wherein the current from said remaining patch members is conducted through the connection member and further through the second main connector.

15. An energy harvesting device according to claim 1, wherein the patch members are configured to be wrapped in multiple layers around the cable.

16. An energy harvesting device according to claim 1, further comprising:
a plurality of separate modules each configured to harvest electrical energy, wherein each of the plurality of modules comprises means for electrically connecting the modules to each other.

17. An energy harvesting device according to claim 1, further comprising:
connection members; and
a rectification unit electrically connected to the patch members by said connection members.

18. An energy harvesting device according to claim 17, wherein the rectification unit comprises an energy storage device.

* * * * *